(12) United States Patent
Lambert

(10) Patent No.: US 7,266,200 B2
(45) Date of Patent: Sep. 4, 2007

(54) METHOD AND APPARATUS FOR ENCRYPTION OF DATA

(75) Inventor: Howard S. Lambert, Southampton (GB)

(73) Assignee: International Business Machines Corporation, Armonk, NY (US)

(*) Notice: Subject to any disclaimer, the term of this patent is extended or adjusted under 35 U.S.C. 154(b) by 677 days.

(21) Appl. No.: 10/294,991

(22) Filed: Nov. 14, 2002

(65) Prior Publication Data

US 2003/0118185 A1    Jun. 26, 2003

(30) Foreign Application Priority Data

Dec. 14, 2001  (GB) ................................ 0129928.8

(51) Int. Cl.
*H04L 9/00* (2006.01)
(52) U.S. Cl. .................... 380/263; 380/28; 380/46; 380/245
(58) Field of Classification Search ............... 380/263, 380/46, 245, 28
See application file for complete search history.

(56) References Cited

U.S. PATENT DOCUMENTS 5,144,664 A * 9/1992 Esserman et al. ........... 380/228

(Continued)

FOREIGN PATENT DOCUMENTS

EP    1 253 797 A2 * 10/2002

(Continued)

OTHER PUBLICATIONS

Yamaguchi, K.; Shibayama, H.; Bifurcation phenomena and chaotic oscillations in a Circuits and Systems, 1989., Proceedings of the 32nd Midwest Symposium on Aug. 14-16, 1989 pp. 1230-1233 vol. 2 Digital Object Identifier 10.1109/MWSCAS.1989.102078.*

(Continued)

*Primary Examiner*—Emmanuel L. Moise
*Assistant Examiner*—Techane J. Gergiso
(74) *Attorney, Agent, or Firm*—Stephen J. Walder, Jr.; Jeffrey S. LaBaw

(57) ABSTRACT

A method and apparatus for encryption of data are provided, in which the data is made up of a series of data items (600). The data items (600) maybe bytes of data or blocks of data. The method includes providing a plurality of encryption algorithms (604), selecting when to change encryption algorithm (601), selecting which encryption algorithm to change to (603), wherein each selection is carried out by applying a Chaotic and/or Catastrophic equation. The plurality of encryption algorithms (604) have index numbers and the generation of an index number by applying the Chaotic or Catastrophic equation selects an encryption algorithm. The selection of when to change encryption algorithm may be determined by a Catastrophic event in the Catastrophic equation and the selection of encryption algorithm may be determined by the surface of a Catastrophic curve on which a point lies, wherein each surface corresponds to an encryption algorithm. The selection of when to change encryption algorithm may be carried out by generating a data item count by applying a Chaotic equation and the encryption algorithm may be selected by generating its index number by applying a Chaotic equation.

19 Claims, 8 Drawing Sheets

U.S. PATENT DOCUMENTS

| | | | | |
|---|---|---|---|---|
| 5,185,796 A | * | 2/1993 | Wilson | 380/277 |
| 5,365,589 A | * | 11/1994 | Gutowitz | 380/43 |
| 5,680,462 A | * | 10/1997 | Miller et al. | 380/263 |
| 5,696,826 A | * | 12/1997 | Gao | 380/28 |
| 5,751,811 A | * | 5/1998 | Magnotti et al. | 380/28 |
| 5,841,946 A | * | 11/1998 | Naito et al. | 706/62 |
| 5,857,025 A | * | 1/1999 | Anderson et al. | 380/28 |
| 6,014,445 A | * | 1/2000 | Kohda et al. | 380/28 |
| 6,049,614 A | * | 4/2000 | Kim | 380/263 |
| 6,363,153 B1 | * | 3/2002 | Parker et al. | 380/263 |
| 6,744,893 B1 | * | 6/2004 | Fleming-Dahl | 380/263 |
| 6,792,111 B1 | * | 9/2004 | Italia et al. | 380/263 |
| 2003/0182246 A1 | * | 9/2003 | Johnson et al. | 705/76 |

FOREIGN PATENT DOCUMENTS

WO     WO98/24205     *   6/1998

OTHER PUBLICATIONS

Sobhy, M.I.; Shehata, A.-E.R.; Chaoti Acoustics, Speech, and Signal Processing, 2001. Proceedings. (ICASSP '01). 2001 IEEE International Conference on vol. 2, May 7-11, 2001 pp. 997-1000 vol. 2 Digital Object Identifier 10.1109/ICASSP.2001.941085.*

Chaos for Stream Cipher Authors: Ninan Sajeeth Philip, K. Babu Joseph Comments: 8 pages 6 figures Subj-class: Cryptography and Security ACM-class: A0 Journal-ref: In proceedings of ADCOM 2000, Tata McGraw Hill 2001 http://arxiv.org/abs/cs.CR/0102012.*

* cited by examiner

METHOD AND APPARATUS FOR ENCRYPTION OF DATA

FIELD OF INVENTION

This invention relates to a method and apparatus for encryption of data. In particular, the invention relates to encryption using indeterministic selection of encryption algorithms.

Data which is transmitted by any means, including along telecommunication links, via media such as storage disks, etc., must be protected to prevent the data being picked up and used by parties other than the intended recipient.

BACKGROUND OF INVENTION

Security of information is a highly important aspect for any party transferring data. Users of networks, especially users of the Internet, are particularly vulnerable to unwanted parties intercepting data. The users may be commercial organisations, governments, universities or private individuals. Networks pass a huge variety of valuable, important and often confidential information. If the information is not secure, the consequences to the user can be disastrous. For example, the results may include financial losses, disclosure of confidential information, loss of confidence from clients and disruption to the user's activities.

In addition to transfer of information via networks, data transferred via other media such as storage disk, is also vulnerable to interception by unwanted parties.

To prevent such intrusion, data encryption methods are used to protect information during transmission from one end point to another. Encryption scrambles the data to make it unintelligible during transmission. In encryption systems, plain data is converted to a secure coded data (cipher text) using an encryption method or algorithm with a secret key. A secret key is known only to the sender and the recipient. The recipient at the intended destination can decrypt the data by using the previously agreed secret key and the reverse of the encryption algorithm.

Data, such as binary data, text data and other forms of data which does not need to be delivered at a given rate, is encrypted in known cryptography systems in blocks of data. The data is broken into blocks of data. The blocks can be formed of a plurality of bytes of data and may be of varying length. Each block is encrypted according to an encryption algorithm on a block by block basis. The decryption of the data is then carried out in a similar block by block manner.

When dealing with streams of data where the data is time dependent as opposed to blocks of text or binary data, block encryption is no longer appropriate or indeed possible. Streams of data include multi-media streams of voice, video, sensor data, and other types of data. This technology is applicable to pervasive computing, media streams, Internet music and video, command and control situations etc.

Streams may have a real time or data rate dependency, or may be sporadic and intermittent. Streams deliver data a byte at a time and may even have bytes skipped. Therefore, the bytes cannot be collected into blocks for encryption before delivery to the intended destination, as this will destroy the delivery rate and flow of the stream of data. For example, a stream of data may be communicated from a control environment in the form of one byte per week, a problem arises if the bytes must be collected into blocks before being communicated.

Current solutions buffer the data and encode the data using block ciphers. This can cause problems with real time or sparse streams. Encryption using Chaotic Equations can be carried out on a byte by byte basis.

Present technology for symmetrical encryption has lower security due to the use of a single algorithm for encryption which has the risk of being broken by brute force. The security can be increased by changing between more than one encryption algorithm. The frequency and time of each change of algorithm must be communicated between the sender and the recipient. The new algorithm to be used must not be determinable from the previous algorithm.

The security of an encrypted data flow can be increased by dynamically changing the encryption algorithm at each end of a secure link simultaneously, without requiring an exchange of information. The dynamic change could occur many times during a data transfer, so that to an external observer at any given instant they would not be able to determine which algorithm is used to encrypt the section of data.

SUMMARY OF THE INVENTION

According to a first aspect of the present invention there is provided a method of encryption of data, in which the data is made up of a series of data items, the method comprising: providing a plurality of encryption algorithms; selecting when to change encryption algorithm; selecting which encryption algorithm to change to, wherein each selection is carried out by applying a Chaotic and/or Catastrophic equation.

The plurality of encryption algorithms may have index numbers and the generation of an index number by applying the Chaotic or Catastrophic equation may select an encryption algorithm.

The selection of when to change encryption algorithm may be determined by a Catastrophic event in the Catastrophic equation and the selection of encryption algorithm may be determined by the surface of a Catastrophic curve on which a point lies, wherein each surface corresponds to an encryption algorithm.

The data items may be bytes of data or blocks of data and the selection of when to change encryption algorithm may be carried out by generating a data item count by applying a Chaotic equation.

Information may be exchanged between a sender and a recipient and the information may include: the Chaotic or Catastrophic equations to be used; the starting variables of the equations; and the index of encryption algorithms.

The encryption algorithms may be Chaotic encryption algorithms in which starting variables of the Chaotic equation are defined as an input key, the Chaotic equation may be applied to each data item by means of an arithmetic operation, and the algorithm may be iterated to update the Chaotic equation and the input key for each data item.

A plurality of the encryption methods may be run each with their own key and the outputs of each encryption method may be applied to the input data items. The outputs may be applied to the input data items by an arithmetic operation.

According to a second aspect of the present invention there is provided an apparatus for encryption of data, in which the data is made up of a series of data items, the method comprising: an index of a plurality of encryption algorithms; means for selecting when to change encryption algorithm; means for selecting which encryption algorithm to change to; wherein each selection is carried out by applying a Chaotic and/or Catastrophic equation.

The index of the plurality of encryption algorithms may have index numbers and the generation of an index number by applying the Chaotic or Catastrophic equation may select an encryption algorithm.

The means for selecting when to change encryption algorithm may be determined by a Catastrophic event in the Catastrophic equation and the means for selecting an encryption algorithm may be determined by the surface of a Catastrophic curve on which a point lies, wherein each surface corresponds to an encryption algorithm.

The data items may be bytes of data or blocks of data and the means for selecting when to change encryption algorithm may be carried out by generating a data item count by applying a Chaotic equation.

Information may be exchanged between a sender and a recipient and the information may include: the Chaotic or Catastrophic equations to be used; the starting variables of the equations; and the index of encryption algorithms.

The encryption algorithms may be Chaotic encryption algorithms in which starting variables of the Chaotic equation are defined as an input key, the Chaotic equation may be applied to each data item by means of an arithmetic operation, and the algorithm may be iterated to update the Chaotic equation and the input key for each data item.

An encryption system may have a plurality of the encryption methods which are run each with their own key and the outputs of each encryption method may be applied to the input data items. The outputs may be applied to the input data items by an arithmetic operation.

According to a third aspect of the present invention there is provided a computer program product stored on a computer readable storage medium comprising computer readable program code means for performing encryption of data made up of a series of data items, including performing the following steps: providing a plurality of encryption algorithms; selecting when to change encryption algorithm; selecting which encryption algorithm to change to; wherein each selection is carried out by applying a Chaotic and/or Catastrophic equation.

BRIEF DESCRIPTION OF THE DRAWINGS

Embodiments of the present invention will now be described, by way of examples only, with reference to the accompanying drawings in which.

DETAILED DESCRIPTION OF THE PREFERRED EMBODIMENTS

Figure 1:
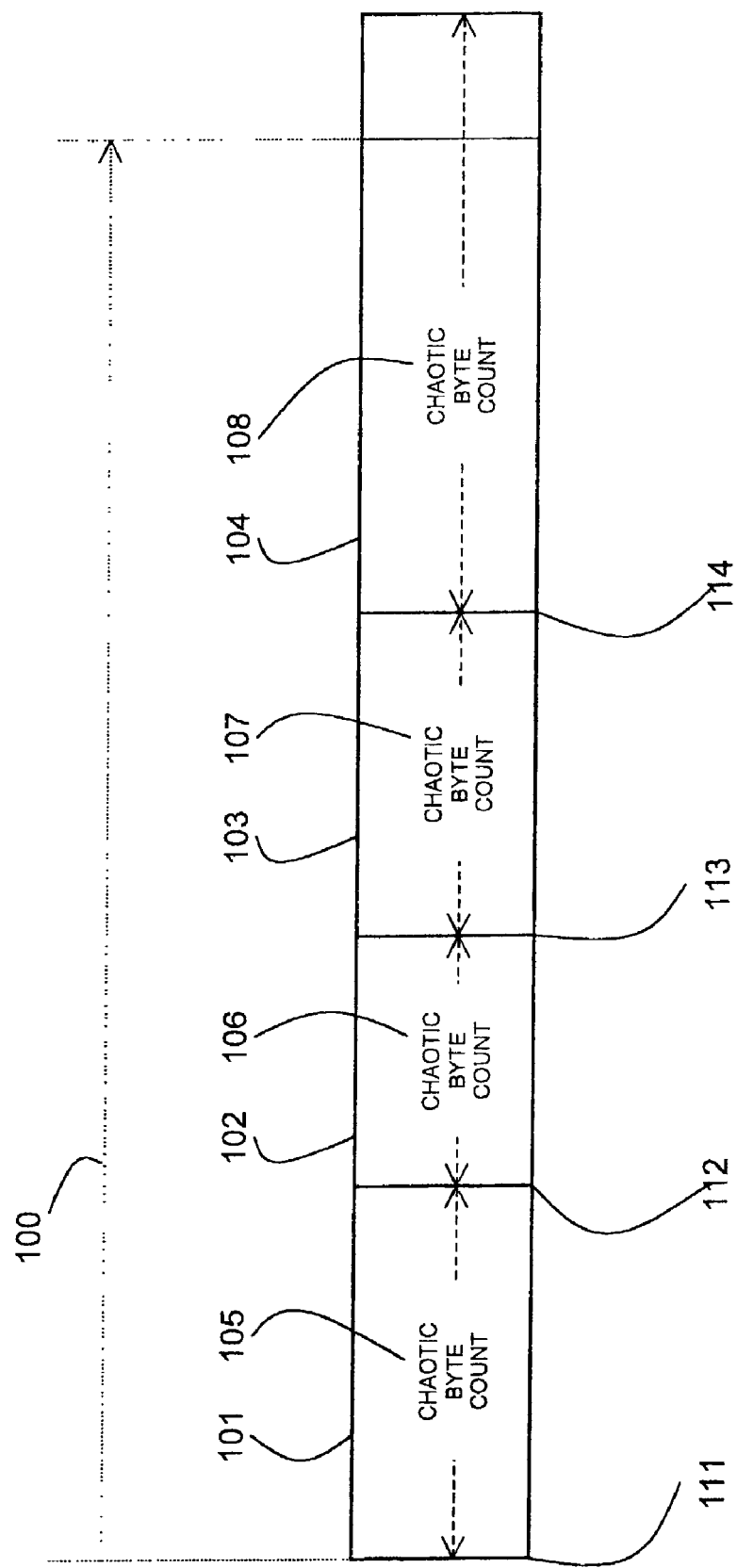
FIG. 1 is diagram of dynamic selection of algorithms using Chaotic Equations in accordance with the present invention.

Encryption methods and systems are described in which multiple encryption algorithms are used when encrypting a stream of data bytes of a series of data blocks. A stream of data bytes or a series of data blocks are both included in the term "data stream" used herein. A data stream is encrypted using a first encryption algorithm. After a first period the first encryption algorithm is changed to a second algorithm. After a second period, the second algorithm is changed to a third algorithm. This process continues such that the algorithm used for encryption is changed many times during a data transfer of the data stream.

A list of possible algorithms to use is provided and an index is used to select an algorithm from the list. The periods at which the algorithms are changed can be numbers of bytes or numbers of blocks in the data stream. The periods can be counted from the beginning of the use of the encryption method, the beginning of a transmission or the end of the preceding period.

In order for the security of the encryption method to be as high as possible, the choice of index number of the algorithm and the period must be selected in a manner which cannot be determined by an interceptor of the encrypted data stream.

Both the sender and the recipient must know the form of the encryption method with the following information which may be used repeatedly when using the encryption method:

A plurality of encryption algorithms with constants.

A starting index of the encryption algorithms.

The sender and the recipient must also know the following key information for a specific transmission:

First selection algorithm used for index number selection.

Second selection algorithm used for period determination.

The starting values of the first selection algorithm.

The starting values of the second selection algorithm.

The first and second selection algorithms may be the same; however, this decreases the security of the encryption.

The described embodiments use Chaotic Equations and Catastrophic Equations as the selection algorithms. Using Chaotic or Catastrophic Equations enables the encryption algorithms and the periods to be selected in a manner which is indeterministic. The changes between encryption algorithms can be effected at both the sending and receiving ends of a secure link simultaneously without an exchange of information once the starting variables have been exchanged.

This dramatically increases the difficulty of breaking into the transmitted data. This method operates as a similar idea to the idea of frequency hopping during wireless transmission.

The encryption algorithms which maybe selected for use can include any form of encryption algorithms. If data is encrypted on a byte by byte basis, encryption using Chaotic Equations may be used. For example, encryption algorithms can be based on Fractal equations, Lorenz attractor equations, Rossler attractor equations, Tinkerbell attractor equations, etc. In Chaotic encryption algorithms, the starting conditions of the variables of the Chaotic equation form the input key. The Chaotic equation is applied to each data item (which may be a single byte) and the input key for the Chaotic equation is iterated for each data item updating the Chaotic equation. The step of applying he Chaotic equation to each data item is by means of a modular arithmetic operation to combine the real and imaginary parts of the result of the chaotic equation and the data item.

Chaotic Equations

Chaos Theory can be used in the selection of the encryption algorithm. This can be done by applying Chaos Theory to a multi-algorithm encryption system, such that:

A chaotic value is generated and used as an index number used to select the algorithm to use for encryption and decryption.

A chaotic value is generated and used to specify how many bytes or blocks are to be encrypted or decrypted before requiring an algorithm change.

FIG. 1 illustrates a byte data stream 100. Different encryption algorithms 101, 102, 103, 104 are used for different sections of the transmitted data stream 100. A Chaotic byte count 105, 106, 107, 108 is carried out for each section. At each change between encryption algorithms, a new Chaotic value 111, 112, 113, 114 is generated and the modulus is used as a seed value to select the next encryption algorithm.

An index of Chaotic Equations which may be used is generated and held by the transmitting party and the receiving party. Chaotic Equations are used to generate an algorithm index number and to generate a byte count. These Chaotic Equations can be the same or different. The byte count determines the number of bytes which are encrypted or decrypted before a new algorithm index and byte count must be generated.

One of the effects of this method is that the chosen algorithm and remaining byte count must be remembered and used for any subsequent data that needs to be encrypted or decrypted. If this is not done the sender and receiver will become out of synchronization and hence the receiver will be unable to decrypt the data.

The following is the method for encryption/decryption using the Chaos multiple algorithm system.

```
...
{Select which encrypt/decrypt algorithm to use        }
function Cipher( data : byte ) : byte;
    begin
        case Algorithm mod 6 of
            0: Result := Mandel( data );
            1: Result := Lorenz( data );
            2: Result := Cipher n ( data );
            ...
            5: Result := Tinker( data );
        end
    end;
...
...
    { main data encrypt/decrypt code                  }
    Index := 0;                      { start index                }
    while Index > length do          { as long as more data       }
        begin
            len :=                   { get remaining count        }
                CountRemain;
            if len <= 0 then         { remaining count ?          }
                begin                { . . . no, new algorithm    }
                    Algorithm :=     { index number               }
                        Cipher( 0 );
                    CountRemain :=   { chaotic byte count         }
                        Cipher( 0 );
                end
            else
                begin                { . . . yes, process it      }
                    if len > (length - Index) then  { too much ?  }
                        len := length - Index;{ . . . yes, set correct  }
                            length
                    CountRemain :=   { save remainder             }
                        CountRemain - len;
                    for Index := Index to len do
                        data[Index] := Cipher( data [Index] );
                end
        end;
...
```

The preceding coding example illustrates the mechanism of using an index number to select a chaotic/fractal algorithm to encode a data byte. The "Index" value is checked to see if the data length has been encoded/decoded. If there is data to process the "CountRemain" value is checked to see if a new algorithm should be selected, i.e. if "CountRemain" is <=0, a new algorithm index is generated and a new "CountRemain" is generated. This process is repeated until "Index" equals the length of the input data, i.e. all the data bytes have been encoded/decoded.

Figure 2:
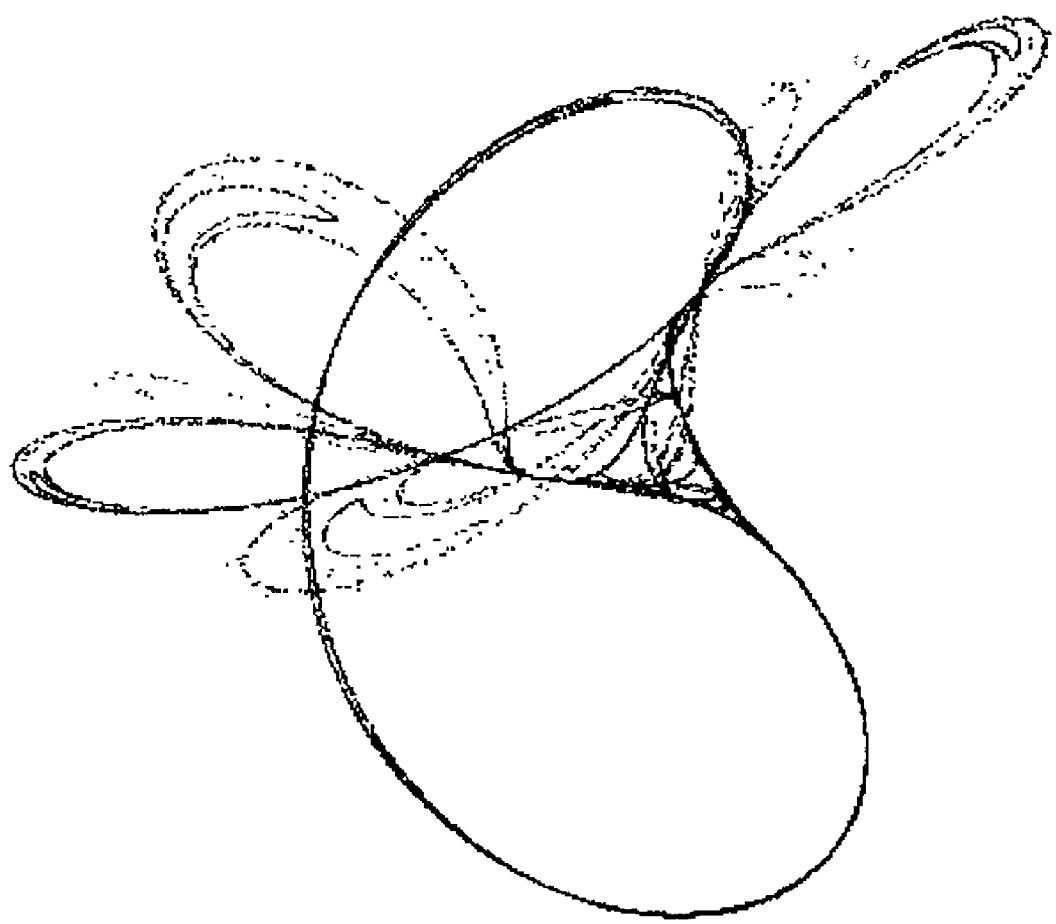
FIG. 2 is a diagram of the Chaotic Equation of a Tinkerbell Attractor.

The following is an example of the above method using Chaotic Equations based on the Tinkerbell Attractor shown in FIG. 2. The Tinkerbell Attractor has the chaotic algorithm:

$$\frac{\partial y}{\partial x} = x_{n+1} = x_n^2 - y_n^2 + ax_n + by_n$$

$$\frac{\partial y}{\partial x} = y_{n+1} = 2x_n y_n + cx_n + dy_n$$

In FIG. 2, a=−0.7, b=−0.6013, c=2.0, d=0.4 and there is a stable orbit at a=0.485.

Const
   a: Extended=−0.7;
   b: Extended=−0.6013;
   c: Extended=2.0;

```
    d : Extended = 0.4;
{ generate a chaotic byte                              }
function Chaos : byte;
    var
        xp : Extended;
    begin
        xp := x * x - y * y + a * x + b * y;
        y := 2 * x * y + c * x + d * y;
        x := xp;
        Result : = Floor ( y - x );
    end;
    { main data encrypt/decrypt code                   }
    Index := 0;                      { start index                 }
    while Index > length do          { as long as more data        }
        begin
            len := CountRemain;      { get remaining count         }
            if len <= 0 then         { remaining count ?           }
                begin                { . . . no, new algorithm     }
                    Algorithm := Chaos( 0 ); { index number        }
                    CountRemain := (Chaos( 0 ) shl 4) or Chaos;
                end
            else
                begin                { . . . yes, process it       }
                    if len > (length - Index) then  { too much ?   }
                        len := length - Index;{ . . . yes, set correct length }
                    CountRemain :=   { save remainder              }
                        CountRemain - len;
                    for Index := Index to len do
                        data[Index] := Cipher( data[Index] );
                end
        end;
```

Catastrophic Equations

Catastrophe Theory can also be applied to a multi-algorithm encryption system. At catastrophic events in the Catastrophic Equation used, the encryption algorithm is changed. (i.e. Not just the parameters but also the whole equation.) Catastrophic Theory is used and the surface a calculated point resides on the catastrophic surface is mapped to an index of encryption algorithms.

Figure 3:
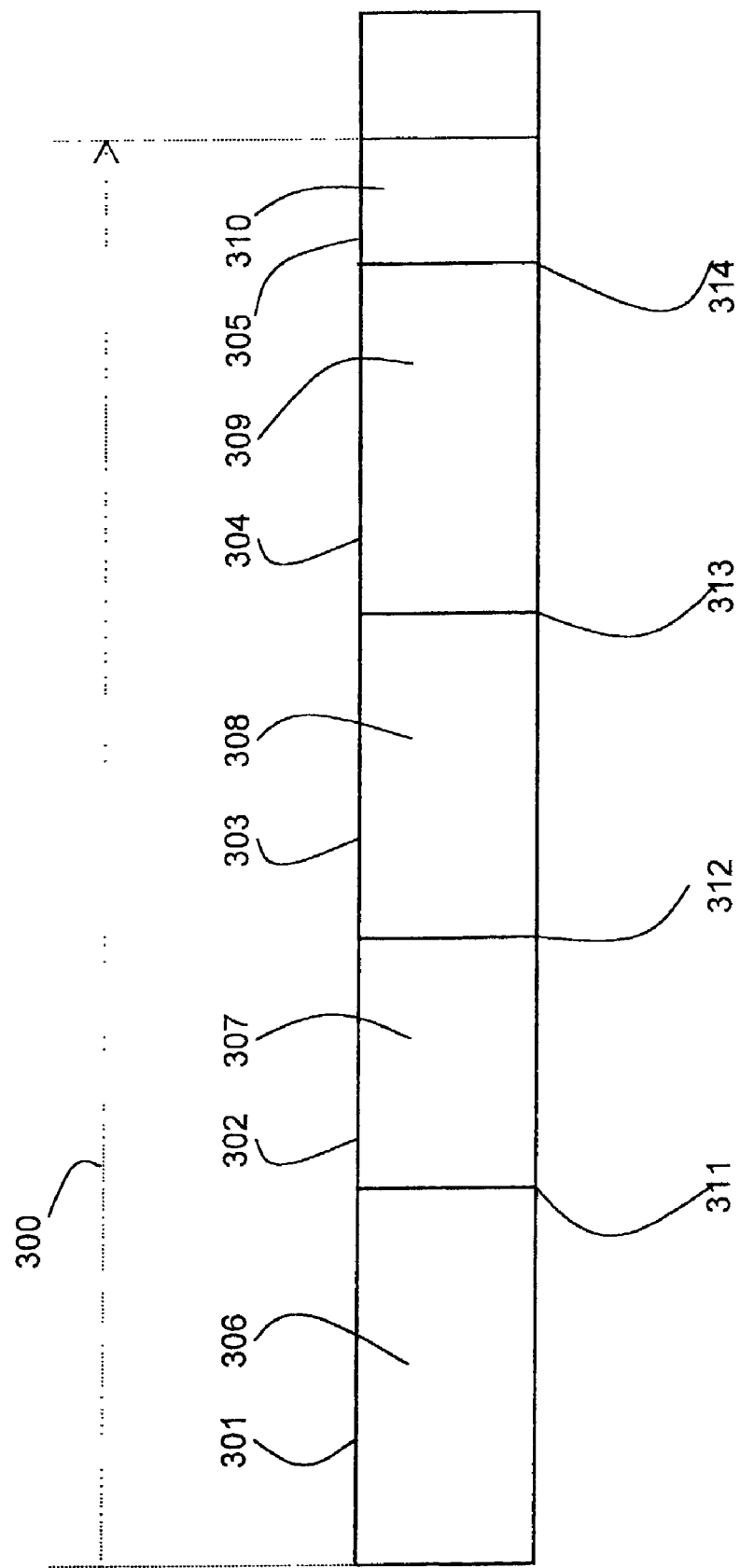
FIG. 3 is a diagram of dynamic selection of algorithms using Catastrophic Equation in accordance with the present invention.

Referring to FIG. 3, a data stream is shown 300. Different encryption algorithms 301, 302, 303, 304, 305 are used for different sections 306, 307, 308, 309, 310 of the transmitted data stream 300. The encryption algorithm is changed at each catastrophic event 311, 312, 313, 314.

Numerous Catastrophe Equations could be used to calculate the catastrophic events. Different equations would generate different numbers of surfaces that in turn allow for differing numbers of encryption algorithms to be used.

Figure 4:
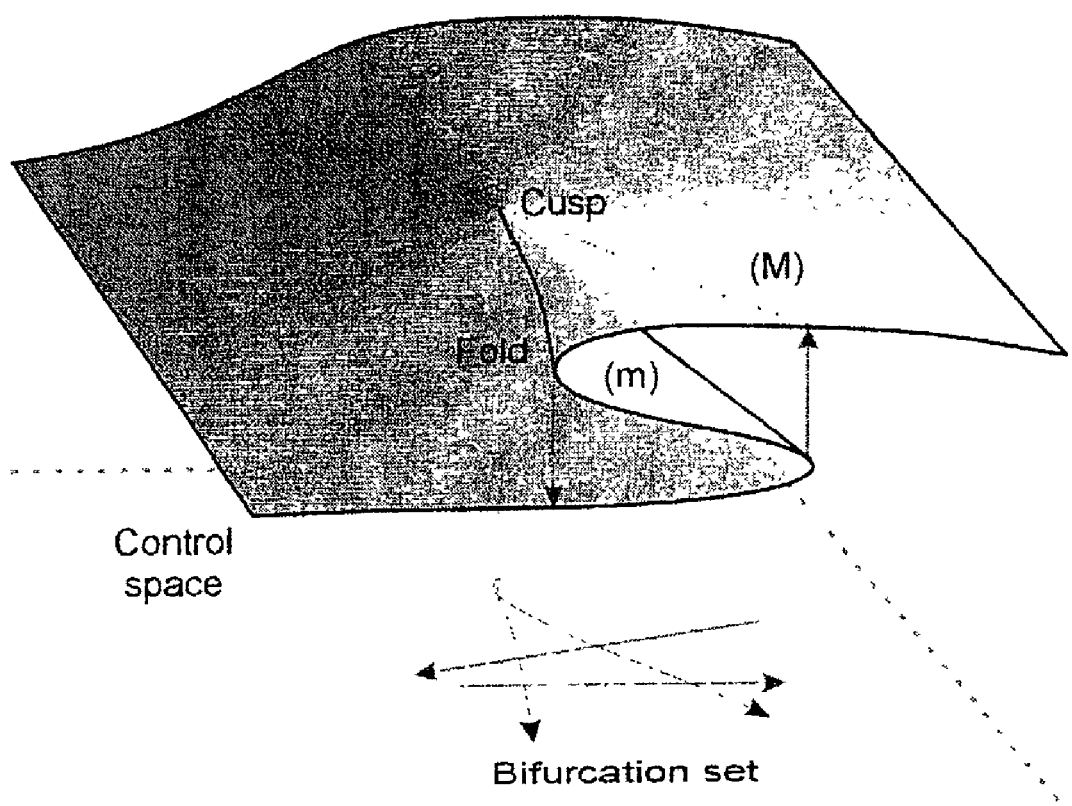
FIG. 4 is an example of a Catastrophic Curve.

A simple catastrophe curve example is shown in FIG. 4 and described below. Starting with a simple surface created with a cubic equation $$f(x)=x^3=a+bx \quad (1)$$

where a, b are the control axes. The fold is given by differentiating the equation. This gives:

$$\frac{\partial f(x)}{\partial x} = 3x^2 = b \quad (2)$$

The bifurcation set is the projection of the Fold onto the control space. It is given by eliminating $x$ from the equations (1) and (2). We obtain $$27a^2=4b^3 \quad (3)$$

The Fold separates the cubic surface into two pieces:

The larger single piece (M) is given by the inequality $$3x^2>=b \quad (4)$$

The smaller piece (m) is given by the inequality $$3x^2<b \quad (5)$$

Using the equations provided by (4) and (5) there is now a simple test to find which part of the surface the current point resides. This gives the mechanism for determining which chaotic equation to use for the next sequence of encryption i.e. if the calculated value:

$3x^2>=b$ if true, the point is on surface (M).

Hence encryption algorithm 1 would be used.

$3x^2<b$ if true, the point is on surface (m).

Hence encryption algorithm 2 would be used.

The position on the surface is calculated for each byte or block of data to be encrypted, the correct encryption algorithm is selected to encrypt the byte or block, and is the encrypted byte or block is then transmitted to the receiving end of the connection.

Because the original equation was a simple cubic equation there are two possible surfaces or states. More complicated equations would lead to more surfaces or states; hence a greater number of encryption algorithms could be used.

Figure 5:
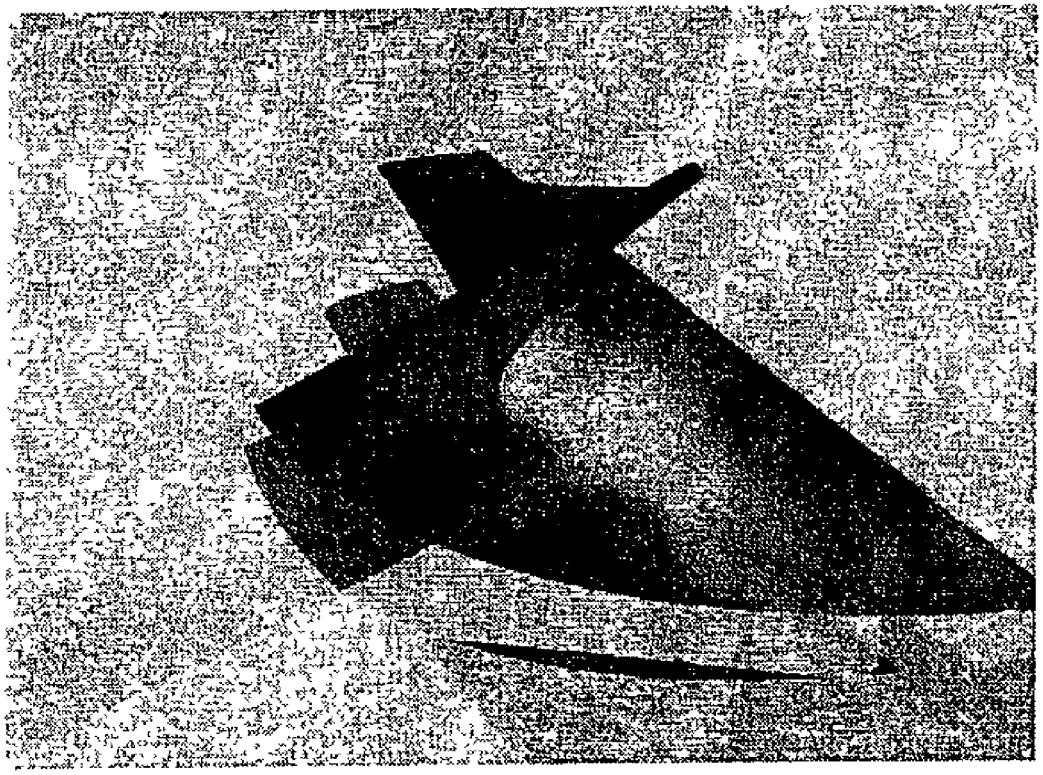
FIG. 5 is a further example of a Catastrophic Curve.

For example, a classic curve from Catastrophe Theory is shown in FIG. 5 and is defined by the following equations:

$$x=uv^2+3v^4 \; y=-2uv-4v^3 \; z=u$$

with $u=(-2,2), v=(-0.8,0.8)$

Combining Techniques

Combining all the preceding techniques, the result is an encryption/decryption process that combines Catastrophe theory with Chaos theory to encode byte streams or series of blocks of data of arbitrary length.

Figure 6:
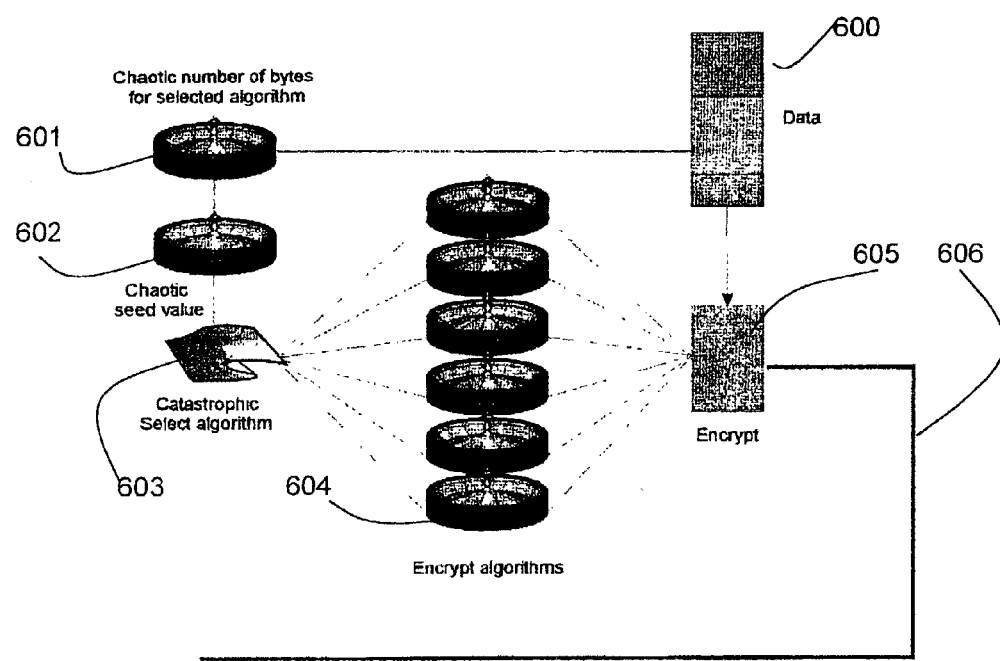
FIG. 6 is a diagram of an encryption method in accordance with the present invention.
Figure 6:
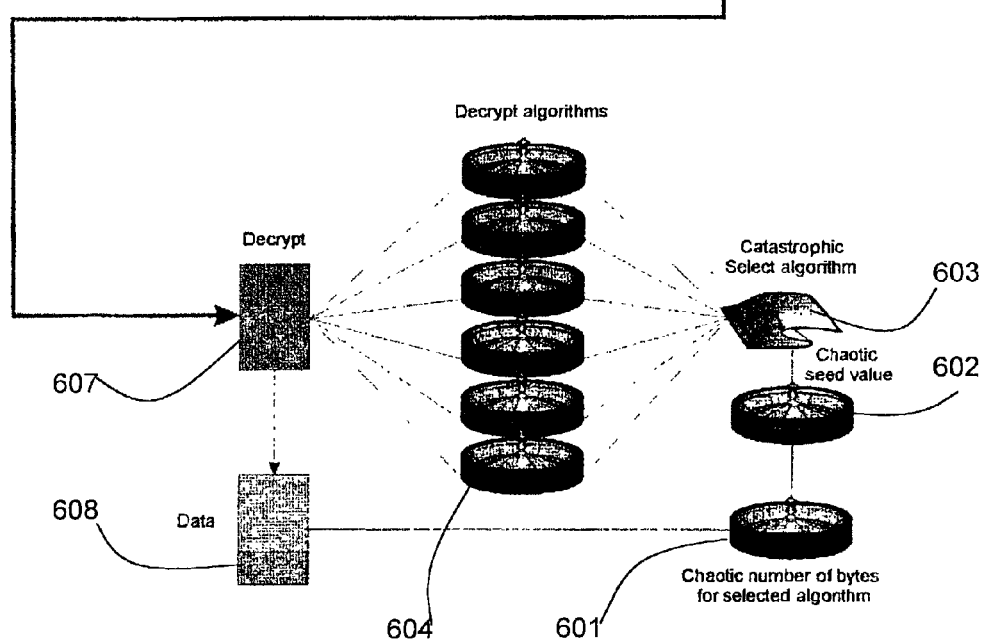

FIG. 6 shows an embodiment of a complete process. Once the initial exchange of the starting conditions (equivalent to a key exchange with a key in excess of 800 bits) has been completed the encryption and decryption will run without any further exchanges other than the encoded data.

Referring to FIG. 6, data to be transmitted 600 is provided. A Chaotic equation 601 is used to generate a number which is used as the number of bytes to be encrypted before the encryption algorithm is changed. A Chaotic equation 602 is used to generate a seed value which is entered into a Catastrophic equation 603. The Catastrophic equation 603 determines an index number for selection of one of a plurality of encryption algorithms 604 available for use. The Catastrophic equation 603 determines which surface of the Catastrophic surface a point is on and the surface corresponds to an index number thereby selecting one of the encryption algorithms 604.

The data 600 is encrypted with the selected encryption algorithm for the length of the data as determined by the number of bytes generated by Chaotic equation 601.

If the encryption algorithm is a form of Chaotic encryption, the input data 600 is combined with an output of a Chaotic equation by an arithmetic operation, for example, by an XOR operation.

The Chaotic equation 601 then generates another number of bytes and the Catastrophic equation 603 determines an index number for the next encryption algorithm to be used.

In this way, all the data 600 is encrypted 605 and sent 606 to the recipient. At the recipient, the encrypted data 607 is received. The same system as the selection of the encryption algorithms is carried out in reverse. The Chaotic and Catastrophic equations to be used and the constants and starting variables, have been previously agreed. The recipient uses the Chaotic equation 601 to generate the number of bytes for which an encryption algorithm is used. A Chaotic equation 602 generates a seed value which is fed to a Catastrophic equation 603 to generate an index number. The index numbers identify the encryption algorithms 604 which may be used. The received data 607 is decrypted to obtain the original data 608.

The determination of the number of bytes (or period) and the index number of the encryption algorithm, can be carried out in a number of ways using Chaotic and Catastrophic equations.

Two Chaotic equations can be used, one to generate the period and one to generate the index number.

A different means of generating a seed value for a Catastrophic equation could be used, with the Catastrophic equation then being used to determine the period (at each Catastrophic event) and the index number (by the surface on which a point lies).

A Chaotic equation could be used to generate the seed value and a Catastrophic equation could be used to determine the period (at each Catastrophic event) and the index number (by the surface on which a point lies).

Multiple Concurrent Cryptors

Multiple concurrent cryptors can be used to strengthen further Chaotic and Catastrophic selection encryption systems.

"n" concurrent Chaotic and/or Catastrophic cryptors are used (where "n" is greater than or equal to 2) each with their own key and the output of all the cryptors is applied simultaneously to the input data stream by using an arithmetic operation or a combination of operations, for example, XOR and/or modular arithmetic.

Figure 7:
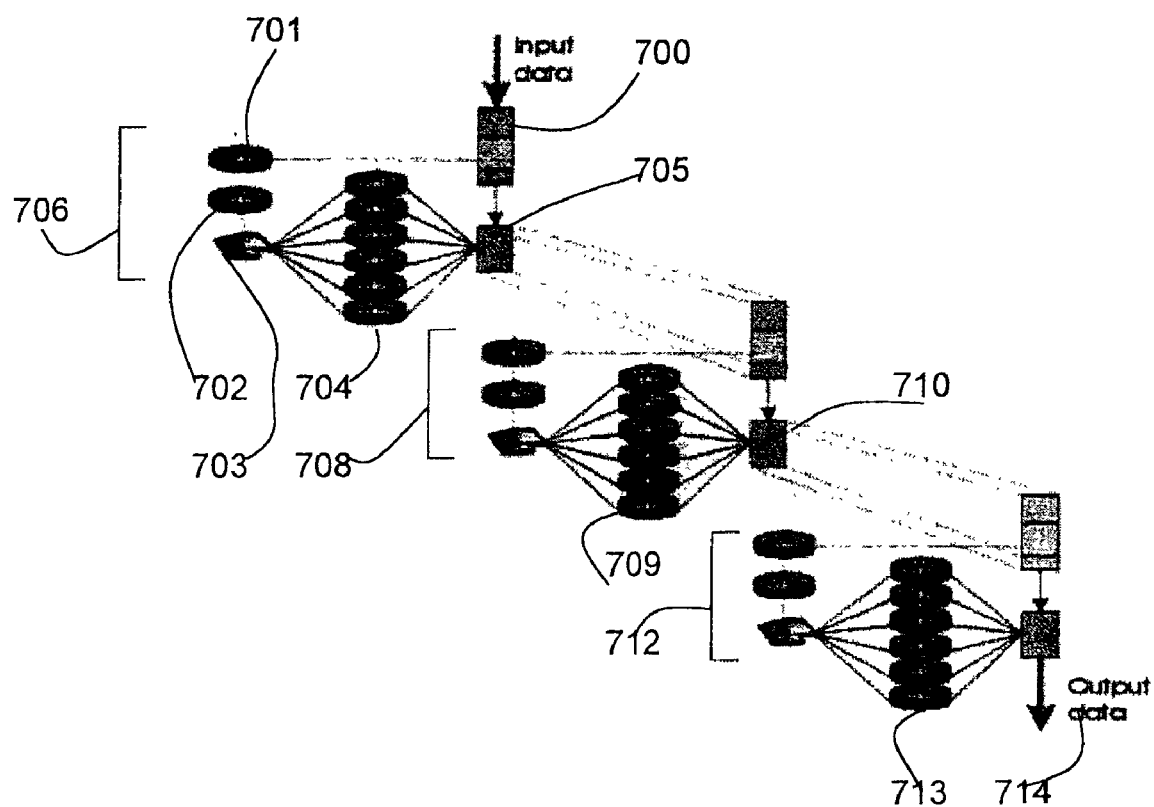
FIG. 7 is a diagram of multiple concurrent cryptors.
Figure 8:
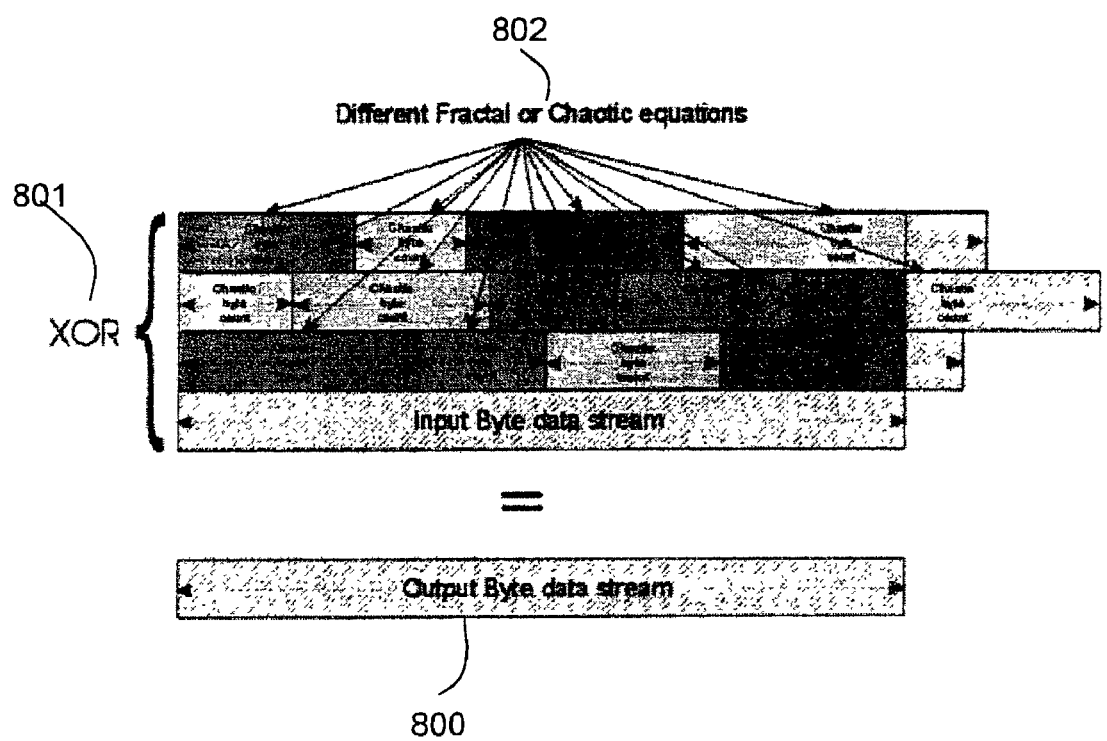
FIG. 8 is a diagram of a multiple cryptor stream.

FIGS. 7 and 8 illustrate the use of three concurrent Chaotic or Catastrophic cryptors running with different keys.

Referring to FIG. 7, in a first cryptor 706, a series of encryption bytes are generated using a plurality of encryption algorithms 704. As described above, the period between the change of encryption algorithms and the choice of encryption algorithm to use are selected by use of Chaotic and/or Catastrophic equations 701, 702, 703. The first cryptor produces encryption output data 705.

The input data 700 is encrypted by combining the input data 700 with the results of the encryption algorithms 704 and this combining may be carried out by using an arithmetic operation.

A second cryptor 708 also selects multiple encryption algorithms 709 with the selection and period of use of each encryption algorithm being carried out by Chaotic and/or Catastrophic equations. The second cryptor 708 produces encryption output data 710 which is combined with input data.

A third cryptor 712 also selects multiple encryption algorithms 713 with the selection and period of use of each encryption algorithm being carried out by Chaotic and/or Catastrophic equations. The third cryptor 712 produces encryption output data 714 which is combined with input data.

The combining operations of each of the cryptors and the input data can be by use of one or a combination of more than one arithmetic operation, for example, XOR, modular arithmetic, etc.

Any number of cryptors can be used depending on the level of security required. Each cryptor produces a key which is applied to the input data, thereby increasing the level of security.

If the encryption algorithms 704, 709, 713 which may be selected are Chaotic encryption algorithms, the input data is combined for each cryptor 706, 708, 712 with the Chaotic equation output for each byte or block of data by an arithmetic operation, for example, XOR.

Referring to FIG. 8, the input data 700 and the outputs 705, 707, 711 of the three cryptors 706, 708, 712 are shown. The encryption algorithms used are Chaotic equations (including Fractal equations). An XOR operation 801 is shown as the means for combining the outputs 705, 707, 711 of the three cryptors 706, 708, 712 and the original input data 700. The combination of the operations results in an output data stream 800.

FIG. 8 can also be represented as follows:

(Input Data) XOR (Cryptor 1) XOR (Cryptor 2) XOR (Cryptor 3)=(Output Data) or (Input Data) XOR (Cryptor 1+Cryptor 2+Cryptor 3)=(Output Data)

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications may be made to the foregoing without departing from the scope of the present invention.

The invention claimed is:

1. A method of encryption of data, in which the data is made up of a series of data items, the method comprising:
   providing a plurality of encryption algorithms;
   encrypting data using a first encryption algorithm;
   selecting when to change from the first encryption algorithm to a second encryption algorithm;
   selecting which second encryption algorithm to change to; and
   encrypting data using a second encryption algorithm, wherein selecting when to change from the first encryption algorithm and selecting which second encryption algorithm to change to are each carried out by applying at least one of a Chaotic or Catastrophic equation.

2. A method as claimed in claim 1, wherein the plurality of encryption algorithms have index numbers and the generation of an index number by applying at least one of the Chaotic or Catastrophic equation selects a second encryption algorithm.

3. A method as claimed in claim 1, wherein the selection of when to change from the first encryption algorithm is determined by a Catastrophic event in the Catastrophic equation.

4. A method as claimed in claim 1, wherein the selection of the second encryption algorithm is determined by a surface of a Catastrophic curve on which a point lies, wherein each surface of the Catastrophic curve corresponds to an encryption algorithm.

5. A method as claimed in claim 1, wherein the data items are bytes of data or blocks of data and the selection of when to change from the first encryption algorithm is carried out by generating a data item count by applying a Chaotic equation.

6. A method as claimed in claim 1, wherein information is exchanged between a sender and a recipient, the information including:
   at least one of the Chaotic or Catastrophic equations to be used;
   starting variables of the equations; and
   an index of encryption algorithms.

7. A method as claimed in claim 1, wherein the encryption algorithms are Chaotic encryption algorithms, each Chaotic encryption algorithm having a Chaotic equation in which starting variables of the Chaotic equation are defined as an input key, wherein the Chaotic equation is applied to each data item by means of an arithmetic operation, and wherein the encryption algorithm is iterated to update the Chaotic equation and the input key for each data item.

8. A method as claimed in claim 1, wherein a plurality of the encryption methods are run each with their own key and the outputs of each encryption method are applied to the data items.

9. A method as claimed in claim 8, wherein the outputs are applied to the data items by an arithmetic operation.

10. An apparatus for encryption of data, in which the data is made up of a series of data items, the apparatus comprising:
   an index of a plurality of encryption algorithms;
   means for encrypting data using a first encryption algorithm;
   means for selecting when to change from the first encryption algorithm to a second encryption algorithm;
   means for selecting which second encryption algorithm to change to; and
   means for encrypting data using a second encryption algorithm, wherein the means for selecting when to change from the first encryption algorithm and the means for selecting which second encryption algorithm to change to each operate by applying at least one of a Chaotic or Catastrophic equation.

11. An apparatus as claimed in claim 10, wherein the index of the plurality of encryption algorithms has index numbers and the generation of an index number by applying at least one of the Chaotic or Catastrophic equation selects a second encryption algorithm.

12. An apparatus as claimed in claim 10, wherein the means for selecting selects when to change from the first encryption algorithm based on a Catastrophic event in the Catastrophic equation.

13. An apparatus as claimed in claim 10, wherein the means for selecting selects a second encryption algorithm based on a surface of a Catastrophic curve on which a point lies, wherein each surface of the Catastrophic curve corresponds to an encryption algorithm.

14. An apparatus as claimed in claim 10, wherein the data items are bytes of data or blocks of data and the means for selecting when to change from the first encryption algorithm selects when to change from the first encryption algorithm by generating a data item count by applying a Chaotic equation.

15. An apparatus as claimed in claim 10, wherein information is exchanged between a sender and a recipient, the information including:
   at least one of the Chaotic or Catastrophic equations to be used;
   starting variables of the equations; and
   an index of encryption algorithms.

16. An apparatus as claimed in claim 10, wherein the encryption algorithms are Chaotic encryption algorithms, each Chaotic encryption algorithm having a Chaotic equation in which starting variables of the Chaotic equation are defined as an input key, wherein the Chaotic equation is applied to each data item by means of an arithmetic operation, and wherein the encryption algorithm is iterated to update the Chaotic equation and the input key for each data item.

17. An apparatus as claimed in claim 10, wherein an encryption system has a plurality of the encryption methods which are run each with their own key and the outputs of each encryption method are applied to the data items.

18. An apparatus as claimed in claim 17, wherein the outputs are applied to the data items by an arithmetic operation.

19. A computer program product stored on a computer readable storage medium comprising computer readable program code means for performing encryption of data made up of a series of data items, including performing the following steps:
   providing a plurality of encryption algorithms;
   encrypting data using a first encryption algorithm;
   selecting when to change from the first encryption algorithm to a second encryption algorithm;
   selecting which second encryption algorithm to change to; and
   encrypting data using a second encryption algorithm, wherein selecting when to change from the first encryption algorithm and selecting which second encryption algorithm to change to are each carried out by applying at least one of a Chaotic or Catastrophic equation.

* * * * *